United States Patent [19]

Fries

[11] Patent Number: 5,412,001
[45] Date of Patent: May 2, 1995

[54] METHOD TO REACTOR-FILL POLYOLEFINS BY FORMATION OF A DUAL CATALYST SYSTEM CAUSING COMPATIBILIZATION OF THE FILLER WITH THE MAXTRIX POLYMER

[75] Inventor: Richard W. Fries, Joliet, Ill.

[73] Assignee: Quantum Chemical Corporation, Cincinnati, Ohio

[21] Appl. No.: 114,034

[22] Filed: Aug. 30, 1993

[51] Int. Cl.$^6$ .......................... C08L 9/02; C08L 9/04
[52] U.S. Cl. .................................. 523/344; 524/855; 526/119
[58] Field of Search .................. 523/344; 524/855; 526/119

[56] References Cited

U.S. PATENT DOCUMENTS

| | | | |
|---|---|---|---|
| 3,678,025 | 7/1972 | Birrell | 526/114 |
| 3,950,303 | 4/1976 | Lipscomb | 523/200 |
| 4,004,071 | 1/1977 | Aishima et al. | 526/116 |
| 4,104,243 | 8/1978 | Howard, Jr. | 523/333 |
| 4,263,422 | 4/1981 | Lowery, Jr. et al. | 526/97 |
| 4,374,753 | 2/1983 | Pullukat et al. | 502/111 |
| 4,473,672 | 9/1984 | Bottrill | 523/215 |
| 4,530,913 | 7/1985 | Pullukat et al. | 502/104 |
| 4,564,647 | 1/1986 | Hayashi et al. | 523/211 |
| 4,786,697 | 11/1988 | Cozewith et al. | 526/88 |
| 4,950,631 | 8/1990 | Buehler et al. | 502/119 |
| 5,098,969 | 3/1992 | Buehler et al. | 526/119 |
| 5,221,650 | 6/1993 | Buehler et al. | 502/107 |
| 5,237,025 | 8/1993 | Beham et al. | 526/114 |
| 5,275,991 | 1/1994 | Buehler | 502/104 |

OTHER PUBLICATIONS

"Polymerization of Ethene by Ziegler Catalysts in the Presence of Fillers", Schoppel et al., Makromol. Chem., Rapid Commun, vol. 3, pp. 483–488 (1982).

Primary Examiner—Paul R. Michl
Assistant Examiner—John J. Guarriello
Attorney, Agent, or Firm—William A. Heidrich

[57] ABSTRACT

The present invention relates to a method to reactor-fill polyolefins and to reactor-filled composites obtained from the instant method. More specifically, the present invention relates to a method to reactor-fill polyolefins comprising the steps of (a) adding a catalytic amount of a low activity catalyst to a filler material either during or before polymerization to initiate the formation of atactic polyolefin on the surface and in the pores of the filler; (b) contacting the product of step (a) in no specific order with a high activity catalyst, a cocatalyst, and, if necessary a cocatalyst modifier; and (c) adding an alpha-olefin under olefin polymerization reaction conditions to the reaction product of step (b) to form a reactor-filled composite. The addition of the low activity catalyst to the filler material causes compatibilization of the filler with the matrix polymer, reduced fines, rounded aggregate particles and increased catalyst activity over an un-filled polymerization catalyst system or by that afforded by the elimination of the low activity catalyst obtained from the method of the present invention. The reactor-filled polyolefin composites produced by the instant invention are characterized as having a relatively uniform distribution of filler particles dispensed therein and having improved physical and rheological properties compared to prior art reactor-filled composites.

31 Claims, 2 Drawing Sheets

METHOD TO REACTOR-FILL POLYOLEFINS BY FORMATION OF A DUAL CATALYST SYSTEM CAUSING COMPATIBILIZATION OF THE FILLER WITH THE MAXTRIX POLYMER

FIELD OF THE INVENTION

The present invention relates to a method to reactor-fill polyolefins. More specifically, the present invention relates to a method to reactor-fill polyolefins comprising the steps of (a) adding a catalytic amount of a low activity catalyst to a filler material either during or before polymerization to initiate the formation of atactic polyolefin on the surface and in the pores of the filler; (b) contacting the product of step (a) in no specific order with a high activity catalyst, a cocatalyst, and, if necessary a cocatalyst modifier; and (c) adding an alpha-olefin under olefin polymerization reaction conditions to the reaction product of step (b) to form a reactor-filled polyolefin composite. The addition of the low activity catalyst to the filler material causes compatibilization of the filler with the matrix polymer, reduced fines, rounded aggregate particles and increased catalyst activity over an unfilled polymerization catalyst system or by that afforded by the elimination of the low activity catalyst.

The present invention further relates to a reactor-filled polyolefin composite obtained from the method of the present invention. The reactor-filled polyolefin composites produced by the instant invention are characterized as having a relatively uniform distribution of filler particles blended therein and having improved physical and rheological properties compared to prior art reactor-filled polyolefin composites.

BACKGROUND OF THE INVENTION

The use of organic polymers in numerous applications has grown in recent years to the degree that rigid polymers such as nylons and polyacetal resins have almost replaced the more conventional metal, wood, and ceramic materials. The development of low cost and efficient methods of preparing polyolefins has made them excellent candidates for a wider range of applications provided that certain physical properties such as heat distortion temperature, stiffness and hardness can be improved.

In recent years, much research has been conducted in the field to develop various methods for improving the physical properties of polyolefins. A vast majority of this research has been directed towards filling polyolefins with finely divided solids or fibrous fillers. One such method of providing filled polyolefins is by melt mixing the polyolefin with the filler material. This procedure, however, requires that the polyolefin be of relatively low molecular weight, that is, have an inherent viscosity less than about 1. While the resulting polymeric products produced by this method generally have increased stiffness, they do suffer from the disadvantage of lower elongation and increased brittleness.

Furthermore, serious problems of compounding these polymers prepared by melt mixing are encountered including the large power requirements for mixing machinery, degradation of the polymers by heating, nonuniformity of filler dispersion, and poor adhesion of the polymer to the filler, even when coupling agents are employed.

Recently, various methods have been proposed and developed to decrease the problems mentioned above, the most widely used method being the polymerization of an olefin in the presence of selected fillers. One suggested method of effecting olefin polymerization on the filler is by employing a coordination catalyst. In this method, well-known coordination catalysts comprising the combination of transition metal halides and esters and a reducing compound such as an organometallic compound of a metal of Group Ia, IIa or IIIa of the Periodic Table of Elements are generally employed. This method in general, however, has not provided toughness in highly filled polyolefin composition.

Another method of improving the physical properties of polyolefins using a filler material is disclosed in U.S. Pat. No. 3,950,303 to Lipscomb. This reference describes a process for polymerizing olefins onto a chromium-modified filler in the presence of an organometallic compound. Moreover, the process disclosed by Lipscomb involves (a) contacting an inorganic filler material with a solution of a chromium(III) compound whereby the chromium compound is adsorbed onto the surface of the filler; (b) activating the chromium-modified filler by drying; (c) dispersing the filler as a slurry in an inert, liquid hydrocarbon; (d) adding an organoalumminum compound to said slurry; and (e) polymerizing an olefin in said slurry. This method is said to result in the formation of an essentially homogeneous, filled polyolefin composition having a good combination of hardness, toughness and stiffness.

U.S. Pat. No. 4,104,243 to Howard, Jr. relates to a process for preparing low viscosity inorganic filler compound dispersions and the use of the same in the preparation of polyolefin/inorganic filler compositions. More specifically, the process as described in the reference involves dispersing a large amount of a finely divided inorganic filler compound as a slurry in an inert hydrocarbon diluent in the presence of an organoaluminum compound. This dispersion may then by contacted with a transition metal polymerization catalyst and an olefin to produce a polyolefin/filler composition.

U.S. Pat. No. 4,473,672 to Bottrill relates to a process of producing a polymer composition which is a composite material containing an olefin polymer and a filler. Moreover, the patentee discloses a polymer composite which is produced by polymerizing an olefin monomer in the presence of a catalyst system obtained by reacting a filler material with (a) an organic magnesium compound which contains a halogen or (b) an organomagnesium compound and thereafter with a halogen-containing compound; and then treating that reaction product with a transition metal compound, which is preferably $TiCl_4$, and an organic activating compound. The resultant homogeneous composites are said to have good flow characteristics.

This method disclosed by Bottrill, however, suffers from the disadvantage that the composite will contain a halogen, therefore, it is necessary to carry out a deashing step. The use of a deashing step is undesirable since those skilled in the art are aware that halogens can adversely affect the polymer product as well as cause corrosion of the machinery used to process the final product.

One such method of overcoming the deashing problem described above is disclosed in U.S. Pat. No. 4,564,647 to Hayashi et al. which relates to a process for producing a polyethylene composition which comprises polymerizing ethylene in the presence of a catalyst comprising a contact treatment product of a high activity catalyst component, a filler and an organoaluminum compound. This process has no need for a deashing step since the catalyst employed has a remarkably high activity with a very low amount of halogen.

Schöppel et al., Makromal. Chem., Rapid Commum., Vol. 3 (1982), pp 483-488 provides a procedure which leads to filled polymers with strong polymer-filler interactions by fixing one component of the catalyst onto the surface of the filler. The reference typically uses $TiCl_4$ as a fixing agent and the catalysts are normal Ziegler catalysts such as $Mg(OEt)_2TiCl_4/Al(iBu)_3$. The procedure described by Schöppel et al. is said to result in high catalyst activity compared with prior art systems.

Despite the current state of the art, none of the references disclosed hereinabove relate to the current method to reactor-fill polyolefins. That is, none of the references disclosed hereinabove relate to a method to reactor-fill polyolefin comprising the steps of (a) adding a catalytic amount of a low activity catalyst to a filler to initiate the formation of atactic polyolefin on the surface and in the pores of the filler; (b) contacting the product of step (a) in no specific order with a high activity catalyst, a cocatalyst and, if necessary, a cocatalyst modifier; and (c) adding an alpha-olefin under olefin polymerization reaction conditions to the reaction product of step (b) to form a reactor-filled composite. The addition of the low activity catalyst to the filler results in the compatibilization of the filler with the matrix polymer, reduces the fines produced therein and increases the catalytic activity compared with prior art catalyst systems. Thus, the present invention represents an advancement in the art due to the above mentioned improvements in the activity and physical properties, i.e., flexural modulus and impact strength, of the reactor-filled composites.

SUMMARY OF THE INVENTION

The present invention relates to a method to reactor-fill polyolefins by forming a dual catalyst system comprising the addition of a low activity catalyst to a filler material either before or during polymerization in the presence of a high activity catalyst. More specifically, the filler material is treated with a low activity catalyst which causes a small amount of atactic polyolefin to be formed on the surface and in the pores of the filler, and subsequently thereafter the treated filler material is then contacted in no specific order with a high activity polymerization catalyst, a cocatalyst, and if necessary, a cocatalyst modifier. An alpha-olefin is then added to the above-reaction product under olefin polymerization conditions to cause the formation of a reactor-filled composite.

In another aspect, the present invention also relates to reactor-filled polyolefin composites obtained by the inventive method of reactor-filling polyolefins. The resultant reactor-filled polyolefin composites produced by the inventive method are characterized as having a relatively uniform distribution of filler particles blended therein, Preferably, the filler particles have a spherical or fibrous shape. Moreover, the reactor-filler polyolefin composites of the instant invention exhibit improved physical and rheological properties compared to prior art reactor-filled polyolefins. Additionally, improved catalytic activity over an unfilled polymerization catalyst or by that afforded by the elimination of the low activity catalyst is obtained by employing the present process.

DETAILED DESCRIPTION OF THE DRAWINGS

Figure 1A:
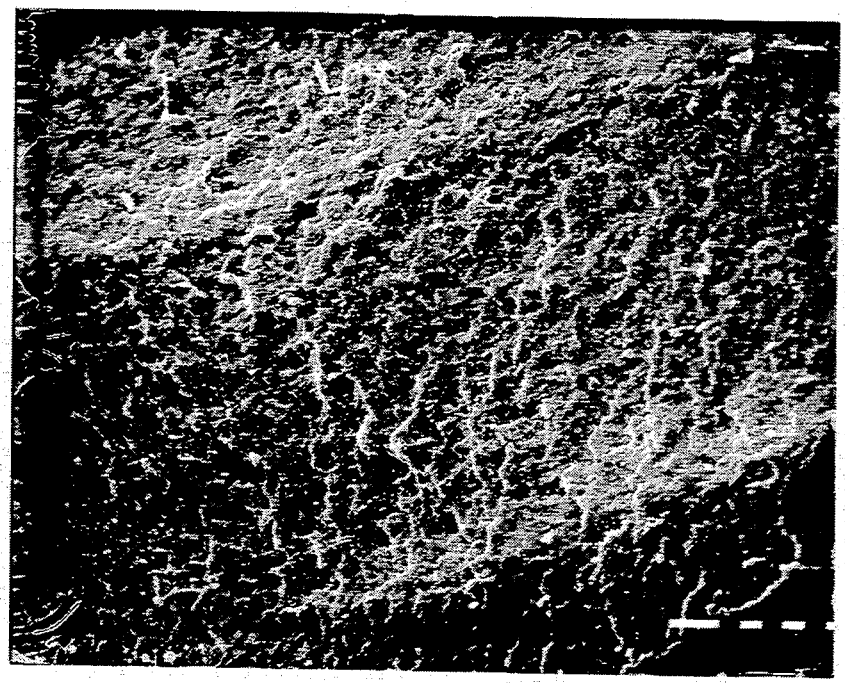
Figure 1B:
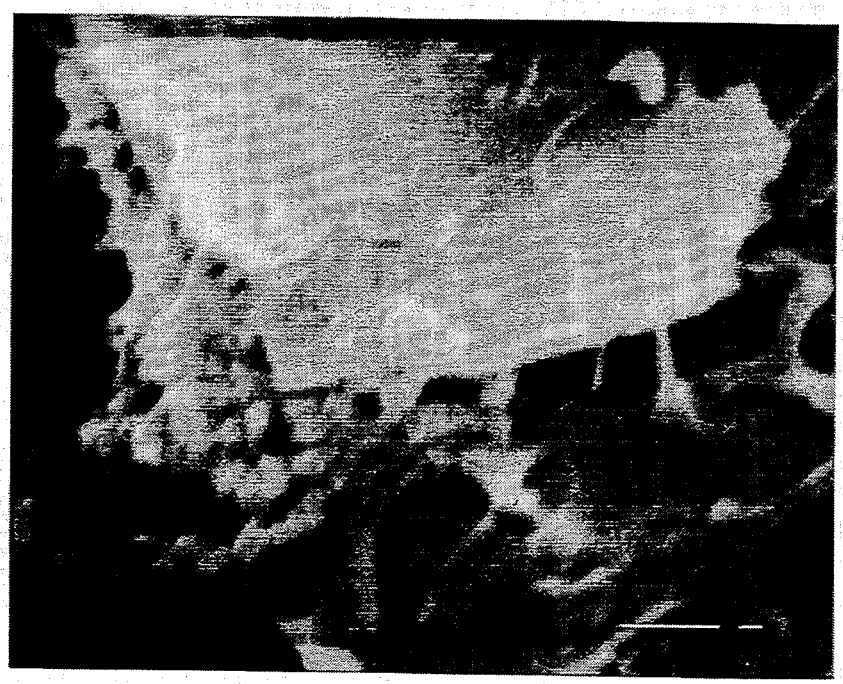
Figure 1C:
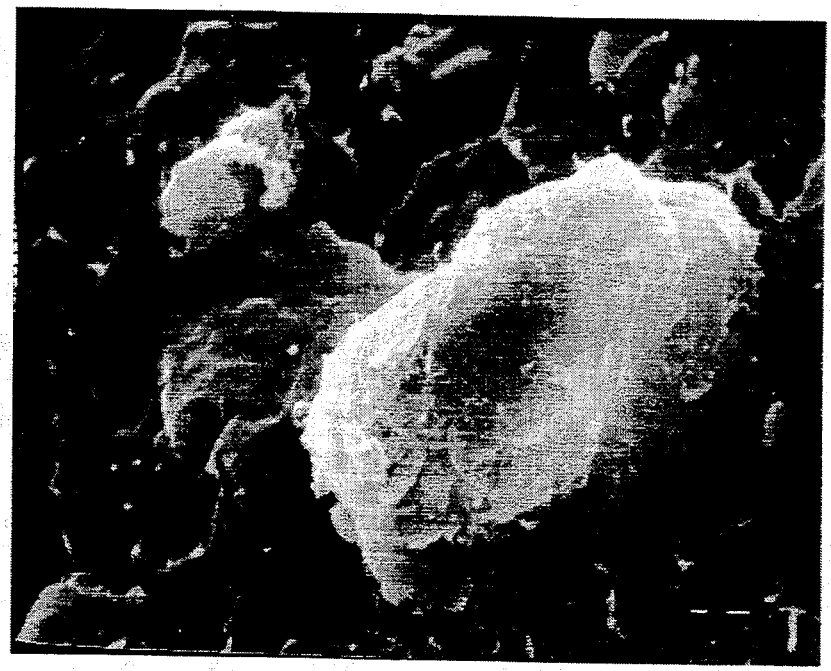
Figure 1D:
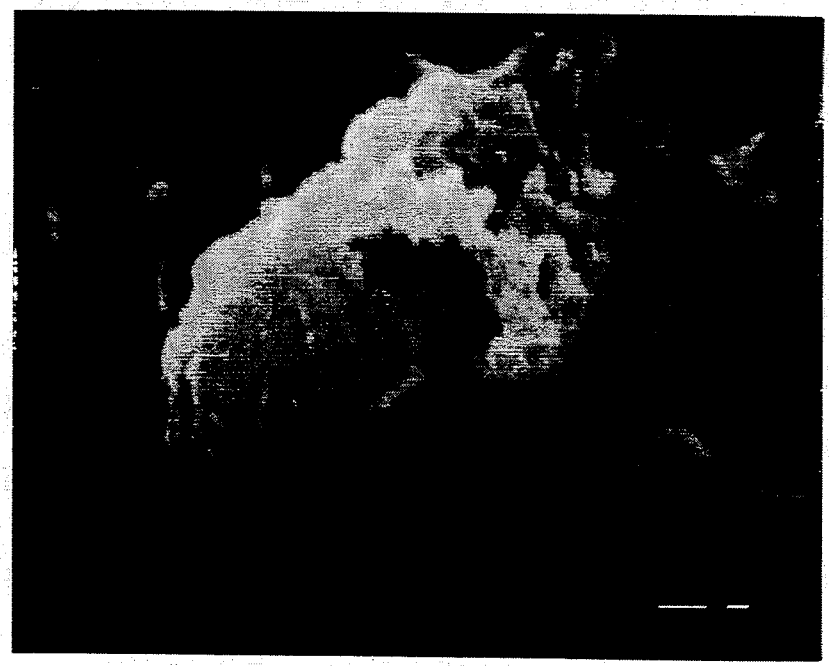

FIG. 1 illustrates the Scanning Electron Micrograph (SEM) of a 9.3% talc filled polypropylene composite at a magnification of (a) 64, (b) 1200, (c) 1900 and (d) 6300, respectively.

DETAILED DISCUSSION OF THE INVENTION

In accordance with the inventive method, a filler material is initially contacted with a catalytic amount of a low activity catalyst which initiates the formation of a polyolefin on the surface and in the pores of the filler material. By low activity catalyst, we mean any catalyst that is able to form sticky atactic polyolefin, such as polypropylene, on the surface and in the pores of the filler material.

The fillers employed by the present invention are any of the conventional fillers which are well known and established in the art. Suitable fillers employed by the present invention include, but are not limited to, mica, talc, $CaCO_3$, kaolin, $Mg(OH)_2$, clay, diatomaceous earth, $CaSO_4$ (amorphous and acicular), carbon black, aluminum, copper, fly ash, silica, glass spheres and fibers, polyvinyl alcohol, graphite, titanium dioxide, and the likes thereof. Of these fillers, mica, talc and kaolin are particularly preferred.

The fillers employed by the present invention are materials which have a surface area of about 0.1 $m^2$/gm to about 500 $m^2$/gm, and a median particle size distribution of about 0.5 microns to about 50 microns.

In a preferred embodiment of the instant invention, the filler is dried and deoxygenated prior to contacting it with the low activity catalyst to remove any surface hydroxyl groups which may inhibit the activity of the resultant catalyst system.

To cause effective removal of surface hydroxy groups from the surface of the filler, the filler is dried in an inert atmosphere at temperatures of about 50° to about 150° C. for a period of about 0.5 to about 72 hrs. More preferably, drying of the filler is performed in an oven at a temperature range from about 100° to about 150° C. for a period of about 10 to about 24 hrs in an inert gas atmosphere, such as nitrogen or argon.

The deoxygenating process can be carried out by evacuating the system under full vacuum and then refilling the system with moisture-free nitrogen at room temperature. This process is typically repeated from about 3 to about 6 times. The deoxygenating process may also be carried out by flowing moisture-free nitrogen over the dried filler material for a time period of about 0.5 to about 24 hrs at a temperature of about 25° to about 100° C.

The dried, deoxygenated filler is then reacted with a low activity catalyst which is effective in causing the formation of atactic polyolefin on the surface and in the pores of the filler. More specifically, the low catalyst employed by the present invention is any catalyst which is able to form sticky atactic polypropylene on the surface and in the pores of the filler. The low activity catalysts useful in the present invention which satisfy the above criterion are transition metal halides of the formula $MX_aY_b$ wherein M is a metal from Groups IVB, VB, and VIB of the Periodic Table of Elements; X is halogen; Y is the same or different alkyl, alkoxy, aryl, aryloxy, benzyl, carbonyl, heteroatom containing group or alkylsilyl; and a and b are 3 or 4, with the proviso that Y cannot all be alkoxy. In a preferred embodiment of the present invention, M is Ti, X is chloride; and a is 4.

The catalytic amount of low activity catalyst added to the filler to initiate the formation of atactic polyolefin on the surface and in the pores of the filler is from about 0.01 to about 1.00 μmol per gram of filler. More preferably, the concentration range of the low activity catalyst added to the filler is from about 1 μmol to about 10 μmol per gram of filler.

The addition of the low activity catalyst to the filler may be conducted neat or in a hydrocarbon solvent which may be either liquid or gaseous under the conditions employed by the present invention. It is a preferred embodiment of the present invention that the low catalyst be solubilized in a liquid hydrocarbon solvent.

The hydrocarbon solvents employed in the present invention to solubilize the low activity catalyst can be any aliphatic or aromatic hydrocarbon solvents containing from 4 to 15 carbon atoms. In a preferred embodiment, aliphatic hydrocarbon solvents such as isobutane, pentane, hexane, heptane, cyclohexane and the like are used to solubilize the low activity catalyst. Of these hydrocarbon solvents, heptane is most preferred.

Prior to use, the hydrocarbon solvents should be purified, e.g. by percolation through silica gel and/or molecular sieves to remove trace quantities of water, oxygen, polar compounds, and other materials capable of adversely affecting the catalyst activity.

Furthermore, all of the contacting steps described herein are carried out in inert atmosphere, such as nitrogen; thus, preventing any air or moisture to come into direct contact with the low activity catalyst and/or the filler.

This contact between the low activity catalyst and the filler occurs at a temperature from about 0° to about 100° C. More preferably, the temperature of this contacting step is from 0° to about 50° C. Most preferably, the temperature is from about 20° to about 30° C.

The time employed for the contacting the filler with the low activity catalyst is from about 0.01 to about 100 hrs. Most preferably, the time of this contacting step is from about 0.1 to about 1 hrs.

The above reaction product is then contacted in random order of no specific sequence with a high activity catalyst, if necessary, a modifying compound(s) and at least one cocatalyst component. In a preferred embodiment, the treated filler is first contacted with a cocatalyst and modifier and then contacted with a high activity catalyst.

The high activity catalysts employed by the present invention are solid catalyst components as described in coassigned U.S. Pat. Nos. 4,374,753, 4,950,631, and 5,098,969 the contents of which are incorporated herein by reference. Moreover, the high activity catalysts employed by the present invention are solid catalysts which are effective in alpha-olefin polymerization reactions. The term high activity catalyst as used herein means any catalyst which is able to produce an isotactic polymer product or a high density polyethylene polymer.

The preferred high activity catalyst utilized in the present invention is prepared by initially contacting a support either inorganic, such as silica, or organic, such as a polyolefin, with at least one organomagnesium compound and, as appropriate, an alcohol or a modifying compound. The modifying compound is employed herein when a polypropylene polymer is desirable whereas an alcohol is used when a polyethylene polymer is desirable.

A preferred support is silica that has a high surface area and high pore volume. The silica employed in the current catalyst system is preferably pure however, it may contain minor amounts of other inorganic oxides. In general, the silica support comprises at least 90%–95% by weight pure silica. In one preferred embodiment the silica is at least 99% pure.

The silica support utilized in the preparation of the catalyst, is preferably a high surface area, high pore volume material defined by a surface area between 50 m²/gm and about 500 m²/gm; a median particle size of about 20 microns to about 200 microns and a pore volume of about 0.5 cc/gm to about 3.0 cc/gm as determined by Standard B.E.T. measurements.

It is a preferred embodiment of the invention that the silica support be pretreated prior to its use to remove any impurities or surface hydroxyl groups which may inhibit the activity of the resultant catalyst component.

To cause effective removal of surface hydroxyl groups from the surface of the silica support, the silica may be calcined in an inert atmosphere at a temperature of at least 150° C. Preferably, calcination of the silica is performed in the temperature range from about 150° C. to about 650° C. in an inert gas atmosphere, i.e. nitrogen or argon.

Another method of removing surface hydroxyl groups involves contacting the silica with a hexaalkyl disilazane or chlorosilanes as disclosed in U.S. Pat. No. 4,530,913 of Pullukat et al., for example. Of the hexaalkyl disilazane useful in this application, hexamethyl disilazane, i.e., H.M.D.S., is particularly preferred.

The silica may also be pretreated by combining the calcination method and treatment with a hexalkyl disilazane. In this method, the sequence of pretreatment may be random; however, it is a preferred embodiment that the hexaalkyl disilazane treatment precede the calcination process.

The pretreated silica is then reacted with an organomagnesium compound which is soluble in organic solvents. The organomagnesium compounds useful in the present invention are the alkyls, alkoxides or aryls of magnesium or its complexes such as complexes with alkyl aluminum compounds. The structural formulas of some of the preferred organomagnesium compounds are $R^2MgX_1$, $R'_2Mg$ and $(R_2{}^2Mg)_n AlR_3{}^2$ where R' and $R^2$ are each independently an alkyl or alkoxide containing from about 1 to about 12 carbon atoms or aryls such as phenyl, naphthyl, and cyclopentadienyl; n is 0.5–10, and X is a halide such as chloride or bromide. Complexes of organomagnesium compounds with organoaluminum halides can also be used. The complexes may contain small amounts of alkoxide. Of the organomagnesium compounds contemplated herein, alkoxymagnesium chlorides are most particularly preferred.

The magnesium-aluminum complex is well known in the art, as disclosed in Aishima et al., U.S. Pat. No. 4,004,071 at column 2, lines 34–40 and column 3, lines 30–36. The complex is prepared according to the teachings of Ziegler et al., Organometallic Compounds XXII: Organomagnesium-Aluminum Complex Compounds, Annalen der Chemie, 605, pp. 93–97 (1957).

The amount of organomagnesium compound added to make the solid catalyst component of the present invention is from about 0.01 to about 5 mmol per gram of silica. More preferably, the concentration range of the organomagnesium compound is from about 0.6 to about 1.25 mmol per gram of $SiO_2$.

The reaction mixture containing the organomagnesium compound and silica is then treated, as appropriate, with an alcohol. Such treatment with an alcohol is employed when a polyethylene polymer is desirable. Suitable alcohols include aliphatic or aromatic alcohols containing from about 1 to about 12 carbon atoms. In a preferred embodiment of the present invention, the alcohol is an aliphatic alcohol containing from 1 to 5 carbon atoms. Of these preferred alcohols, n-butyl alcohol is particularly preferred.

The amount of alcohol added to the reaction mixture is from about 0 to about 5 mmol per gram of silica. More preferably, the concentration range of alcohol is from about 0.5 to about 1.25 mmol per gram of silica.

The modifying compounds that may be optionally employed by the present invention as a catalyst component are silanes having the formula $SiH_rX_s^2$, where $X^2$ is halogen; r is 0 or an integer of 1 to 3; and s is an integer from 1 to 4; with the proviso that the sum of r and s is 4. These modifying compounds are added to the reaction mixture containing the organomagnesium compound and the silica and are employed when a polypropylene polymer is desirable. Suitable silanes having the above formula include silicon tetrachloride, trichlorosilane, tribromosilane, dichlorosilane, dibromosilane and mixtures thereof. Of these halogenated silanes, silicon tetrachloride is most particularly preferred.

The concentration of the modifying compound employed by the present invention as a catalyst component is from about 0.01 to about 5 mmol per gram of silica. More preferably, the molar ratio of the modifying compound to the high activity catalyst is from about 0.6 to about 1.25 mmol per gram of $SiO_2$.

The contacting step between the silica and the soluble organomagnesium compound(s) usually occurs at a temperature in the range of between about 15° C. and about 120° C. More preferably, this contact occurs at a temperature in the range of between about 50° C. and 110° C. The contact occurs over a period of between about 30 minutes and about 4 hours. Preferably, the contact occurs over a period of between about 1 hour and about 3½ hours. Still more preferably, this contact occurs over a period of between about 1½ hours and about 2½ hours.

The organic solvent employed to solubilize the organomagnesium compounds can be any aliphatic or aromatic hydrocarbon solvents mention previously hereinabove.

In yet another preferred embodiment, the reaction product of the magnesium component and silica component is then dried under precisely defined conditions until most of the heptane solvent is removed. The drying process utilized by the present invention has been previously described in copending and coassigned patent applications U.S. Ser. No. 854,199 filed Mar. 20, 1992 (now U.S. Pat. No. 5,221,650), and U.S. Ser. No. 984,052 filed Nov. 30, 1992 (now U.S. Pat. No. 5,275,991), the contents of which are incorporated herein by reference. This drying process is effective in providing effective wetting of the surface area of said compound such that a regular essentially continuous distribution of accessible magnesium values is present on the support material for further reaction. The process provides a statistically averaged surface coverage of magnesium values of about 1 to about 3 layers.

Typically, drying will be conducted under an atmosphere of and with a slow purge e.g. 10 ml/min. of nitrogen; in small volumes the granular coated support may be dried in a paddle stirred container with heat supplied from an external source.

The solid product containing the organomagnesium compound is then reacted with at least one or more transition metal compounds belonging to Groups IVB and/or VB or the Periodic Table.

The transition metal compounds belonging to Group IVB of the Periodic Table have the structure formula $M'X^2_p(OR')_q$ wherein M' is titanium or zirconium; R' is aryl, alkyl, aralkyl, cycloalkyl or alkylsilyl; $X^2$ is a halogen; p is an integer from 1 to 4; and q is 0 or an integer from 1 to 3; with the proviso that the sum of p and q is 4. It is especially preferred that M' be titanium.

In the preferred embodiment, the titanium-containing compound is characterized as "p" being an integer from 2 to 4 and q is 0 or an integer 1 or 2. Suitable titanium compounds within the contemplation of this embodiment are titanium tetrachloride, titanium tetrabromide, methoxytitanium trichloride, ethoxytitanium trichloride, diethoxytitanium dichloride and the like.

Still, more preferably, the titanium-containing compound is defined by "p" being 4, "q" being 0, and $X^2$ is chlorine or bromine. Thus, the titanium compound is most preferably titanium tetrachloride or titanium tetrabromide. Of these two titanium compounds, titanium tetrachloride is most preferred.

Suitable transition metal compound belonging to Group VB are compounds that have the structural formula $M''(OR')_x(O)_y(X^2)_z$ wherein M'' is a metal of Group VB; R' is a hydrocarbyl having from 1 to 18 carbon atoms; $X^2$ is halogen; x is 0 or an integer from 1 to 5; and y is 0 or 1; and $z=(5-x-2y)$ or 4 or 3 when $x=0$, $y=0$. It is especially preferred that M'' be vanadium.

Suitable vanadium compounds encompassed by the above formula include vanadium oxyhalides, vanadium alkoxides, vanadium carboxylates, vanadium halides and mixtures thereof. It is especially preferred that the vanadium-containing compound be vanadium tributyloxy, triisobutyl vanadate, vanadium tetrachloride, and the like thereof.

This contact between the transition metal-containing compounds and the organomagnesium-containing solid product occurs at a temperature from about 0° to about 100° C. More preferably, the temperature of this contacting step is from 20° to about 100° C. Most preferably, the temperature is from about 25° to about 50° C.

The time employed for contacting the solid product with the transition metal-containing compounds is from about 0.25 to about 4 hrs. Most preferably, the time of this contacting step is from about 0.25 to about 1 hr.

The concentration range of transition metal-containing compound (Tm) employed by the present invention is from about 0.01 to about 5 mmol of transition metal compound per gram of silica. More preferably, the concentration of transition metal compound used in this contacting step is from about 0.05 to about 1.0 mmol of transition metal compound per gram $SiO_2$.

It should be appreciated that all the treatment steps in the formation of the high activity catalyst component of this invention, the contact of silica with the organomagnesium compound and the transition metal compounds, involve contact between a solid, silica, and a liquid. This is because each of the compounds that are contact with the silica are liquids or are soluble in an inert hydrocarbon solvent under the conditions employed by the present process. As such, no ball-milling or other solid mixing is required. Ball-milling is an expensive and difficult operation, usually in the formation of polymerization catalysts of the prior art; it is thus eliminated. Those skilled in the art are aware, in the case where a hydrocarbon is employed, that the solvent may be allowed to remain with the reaction mass or can be removed by decantation, filtration, evaporation, or the like.

The cocatalyst components employed by the present invention are conventional aluminum-containing cocatalysts well known in the art. Moreover, the aluminum-containing cocatalysts employed by the instant invention are effective in activating the low activity catalyst component as well as, the high activity catalyst component.

The aluminum-containing cocatalysts are preferably alkylaluminum-containing compounds. Alkylaluminum-containing compounds suitable for the present process include trialkylaluminum, alkylaluminum halide, alkylaluminum hydride, aluminoxane (either cyclic or linear) or mixtures thereof. More preferably, the cocatalyst is a trialkylaluminum compound. Of the trialkylaluminum compounds triethylaluminum is particularly preferred.

The molar ratio of aluminum-containing cocatalyst to high activity catalyst component is from about 1 to about 200. More preferably, the molar ratio of cocatalyst to high activity catalyst is from about 10 to about 100.

The cocatalyst modifiers that may be optionally employed by the present invention are required when a polymer of polypropylene is being produced. The cocatalyst modifiers of this invention are hydrocarbyl alkoxysilanes. Preferred hydrocarbyl alkoxysilanes include hydrocarbyl trialkylsilanes, dihydrocarbyl dialkoxysilanes and trihydrocarbyl alkoxysilanes. Of the hydrocarbyl trialkoxysilanes, those preferred involve a hydrocarbyl having the meaning phenyl and $C_1$–$C_6$ alkyl; and a $C_1$–$C_{10}$ trialkoxy. Particularly preferred species include hexyltrimethoxysilane, amyltriethoxysilane and isobutyltrimethoxysilane.

The reaction product containing the low activity catalyst and the high activity catalyst is then contacted with an alpha-olefin. Alpha-olefins suitable in this reactor-filled method include $\alpha$-olefins containing from two to twelve carbon atoms such as ethylene, propylene, butene, pentene, and the like. Mixtures of these alpha-olefins are also contemplated herein.

In a particularly preferred embodiment of the present invention, the olefin polymerized is propylene.

In this preferred embodiment, polymerization of propylene occurs at a temperature in the range of between about 40° C. and 250° C. More preferably, the temperature of this reaction is in the range of about 50° C. and about 150° C. The pressure of the propylene polymerization reaction is in the range of between about 50 psig and about 1000 psig, more preferably between about 100 psig and about 700 psig. In a preferred embodiment the propylene polymerization occurs in the presence of hydrogen gas.

In another aspect, the present invention relates to a reactor-filled polyolefin composites obtained from the present method. The reactor-filled polyolefin composites produced by employing the reactor-filled method of the present invention exhibit improved physical properties such as melt index, as well as rheological properties, such as flexural modulus, impact strength, and etc, compared to unfilled polymers or composites obtained using prior art systems.

Furthermore, the reactor-filled polyolefin composites produced herein have a relatively uniform distribution of filler particles dispensed in the final product. Moreover, the reactor-filled composites of the present invention have a reduced number of fines dispersed therein. By reducing the number of fines, we mean that the reactor-filled composites contain less than about 1% of fines which have an average particle size of less than 45 microns. The filled particles may be powdery, fibrous, pulverized, spherical or granular in shape. Moreover, since the melt index of the polymer blend can be controlled by the matrix polymer formed in-situ, composite materials useful for injection molding and compression molding can be obtained whereas prior art reactor-filled polyolefin composites are suitable mostly for compression molding.

The reactor-filled composites produced by the present invention are suitable for a wide range of applications such as U.V. stabilizers, wires and cables, flame retardants and the like. Additionally, the present reactor-filled composites may be employed in a variety of applications wherein high flexural modulus, high impact strength or high tensile strength is desired.

The following examples are given to illustrate the scope of the present invention. Because these examples are given for illustrative purposes only, the invention embodied therein should not be limited thereto.

EXAMPLE 1

Into a one-liter autoclave was added 10.2 gms talc which had been previously dehydrated at 100° C. for about 8 hrs. and deoxygenated by evacuating the system under full vacuum and refilling 6 times with moisture-free nitrogen. The dehydrated, deoxygenated talc was then dampened with 25 ml of heptane and subsequently thereafter 10 $\mu$l of titanium tetrachloride was slowly added with stirring. The talc/filler slurry was then allowed to react for about 5 minutes at a temperature of 25° C.

After this period, a solution of triethyl aluminum (TEAL) and isobutyl isopropyl dimethoxysilane modifier was added to the slurry. Thereafter, 0.025 gms of a solid titanium catalyst as described in Example 1 of U.S. Pat. No. 5,098,969 was introduced into the reactor and hydrogen was added by a pressure drop of 20 psig from a 150 cc vessel. Thereafter, polypropylene polymerization was commenced. The TEAL/silane/Ti molar ratio was about 100/10/1.

The polymerization reaction was carried out for 1.5 hrs. at a set-point reaction temperature of 83° C.

The results of the reactor-filled polypropylene composite produced by this example are shown in Table 1. The data shows that the presence of a filler does not adversely effect the process. This is evident in that the catalyst activity as well as the melt flow and bulk density values are not significantly different from the valves report in CE1 or CE2.

EXAMPLES 2–13

Reactor filled polypropylene composites were prepared in accordance with Example 1, however, different filler materials in various amounts were employed. Also, various concentrations of TiCl$_4$ were employed, however, a concentration of about 1 $\mu$mol TiCl$_4$/gm filler was maintained in each experiment.

The results using the various reactor-filled propylene composites are illustrated in Table 1. The data for these examples shows that the presence of a filler does not adversely effect the activity or the physical properties of the system. Furthermore, in most cases the activity of the system was increased when a filler was employed.

COMPARATIVE EXAMPLE 1

An unfilled polypropylene composite was prepared in accordance with Example 1, however, no filler or TiCl$_4$ was added. The results of this control example are shown in Table 1.

The data for this control experiment illustrates the importance of adding a filler and TiCl$_4$ to the system. The absence of these two components resulted in low activity of the catalyst system compared with the examples of the present invention wherein both components where employed.

COMPARATIVE EXAMPLE 2

An unfilled polypropylene composite was prepared in accordance with Example 1, however, no filler material was employed in this comparative example. The results for this comparative example are shown in Table 1.

The data for this comparative example illustrates that the process of the present invention is not adversely effected even though polypropylene is filled. That is, the filled polypropylene composites of the present invention have similar catalyst activity as well as melt flow and bulk density values compared to that of the unfilled polypropylene composite.

COMPARATIVE EXAMPLE 3

An unfilled polypropylene composite was prepared in accordance with Example 1, however, no filler or solid titanium catalyst was employed. The results of this comparative example are shown in Table 1.

The data of this comparative unfilled composite indicates that if no filler or catalyst is used, TiCl$_4$ will act as a poison to the catalyst system. This is clearly illustrated by the low activity observed for this system compared with the activity values observed in Examples 1–13.

EXAMPLE 14

Effect of Reactor-Filling on Particle Size Distribution for a Reactor-filled Polypropylene Composite This example illustrates the effects of reactor filling on particle size distribution for a polypropylene composite having Mg(OH)$_2$ particles dispensed therein. The polypropylene composites of the present example were prepared in accordance with the procedure described in Example 1, however, Mg(OH)$_2$ was employed as the filler material.

Table 2 reports the effects of using 30 micron Mg(OH)$_2$ filler with the high activity polymerization catalyst of Example 1. By this method, the particle size analysis of the reactor-filled polymers shows fewer fines than for the unfilled control. Additionally, the reactor-filled material has a narrow distribution and larger particle size than the unfilled control.

EXAMPLE 15

The example illustrates the various improved physical and rheological properties of reactor-filled composites that can be obtained by employing the present invention. Each of the reactor-filled polymers was prepared in a similar manner as described in Example 1 except that various filler materials having a wide range of loadings were used.

The physical and rheological data of these reactor-filled polymers and an unfilled polymer are listed in Table 3. The basic trends observed in the various reactor-filled composites are that the flexural modulus goes up with increasing fill, while melt flow and impact strength are lowered. For example, when amorphous CaSO$_4$, mica and talc is treated with TiCl$_4$ and used to reactor-fill polypropylene a slight increase in flex and impact are observed.

Scanning electron micrographs (SEM) on representative samples were performed. For example, the SEM of 9.3% talc filled polypropylene at magnifications of 64, 1200, 1900 and 6300 is shown in FIGS. 1a–d, respectively. As can be seen in FIG. 1a, the talc filled polypropylene contains a uniform distribution of talc particles dispersed therein. At magnification of 1200, 1900 and 6000 wetting or adhesion of the filler particles to the polypropylene polymer are seen.

The viscosities ($\eta^*$) at sweep frequencies of 100 and 0.1 radians/sec are also summarized in Table 3. The increased $\eta^*$ 0.1 values for filled polymers are indicative of melt strengths which are measurably increased by filling. Values at $\eta^*$ 100 indicate the ease of processing of the melt. These filler polymers of the present invention have somewhat more resistance to flow than unfilled polymers.

EXAMPLE 16

Experiments illustrated in Table 4 were conducted in a 5-gallon reactor under the conditions of Example 1, however, different fillers in various amounts were employed. Each experiment employed TiCl$_4$ in a concentration of about 1 $\mu$mol TiCl$_4$/gm filler. As in Example 5, the flexural modulus is increased by filling and in some cases so is the impact strength. The materials exhibit good melt flow characteristics even when filled.

TABLE 1

| EXAMPLE | FILLER | g POLYMER PRODUCED/ g/CAT | % FILL | MELT FLOW | BULK DENSITY |
|---|---|---|---|---|---|
| C1 | None and No TiCl$_4$ | 5,645 | 0 | 7 | 19 |
| C2 | None and 10 $\mu$l TiCl$_4$ | 9,505 | 0 | 16 | 21 |
| C3 | None and No catalyst (10 $\mu$l TiCl$_4$ only) | 550 | 0 | NA | NA |
| 1 | Talc | 9,610 | 4 | 4 | 19 |
| 2 | Talc | 9,835 | 8 | 6 | 22 |
| 3 | Mica | 9,580 | 4 | 8 | 22 |
| 4 | Graphite | 8,950 | 4 | 7 | 23 |
| 5 | Graphite | 10,600 | 7 | 8 | 23 |
| 6 | Graphite | 9,620 | 11 | 13 | 23 |
| 7 | Kaolin | 10,193 | 4 | NA | 19 |
| 8 | CaSO$_4$ (acicular) | 9,200 | 40 | 30 | 20 |
| 9 | Glass Fiber | 9,300 | 8 | 17 | 17 |
| 10 | Alumino-Silicate Ceramic Fiber | 8,400 | 2.4 | 4.1 | NA |
| 11 | Ultra High Molecular Weight Polyethylene | 7,280 | 5.5 | 7.7 | 19.2 |
| 12 | Copper Powder | 11,000 | 3.8 | 13.1 | 25.9 |

TABLE 1-continued

| EXAMPLE | FILLER | g POLYMER PRODUCED/ g/CAT | % FILL | MELT FLOW | BULK DENSITY |
|---|---|---|---|---|---|
| 13 | Aluminum Powder | 8,000 | 19.0 | 29.5 | 26.9 |

TABLE 2

| Sieve Size (Microns) | Control % | 15% Mg(OH)$_2$ Filled % |
|---|---|---|
| 1400 | 34.6 | 23.4 |
| 710 | 38.8 | 52.2 |
| 300 | 15.0 | 18.6 |
| 150 | 8.5 | 4.7 |
| 90 | 2.6 | 1.1 |
| 45 | 0.4 | 0.0 |
| Pan | 0.0 | 0.0 |

TABLE 3

| | % Fill | Flex | Notched Impact | Density | Melt Flow | (5% Stain) $\eta$ *100 | $\eta$ *0.1 |
|---|---|---|---|---|---|---|---|
| Control | | 156,000 | 0.54 | 0.9025 | 22–25 | 2,617 | 10,250 |
| Fly Ash | 5.8% | 172,000 | 0.46 | 0.9474 | 16.1 | 3,062 | 23,400 |
| | 12.7% | 188,000 | 0.47 | 1.0010 | 9.6 | 2,845 | 27,700 |
| | 18.8% | 192,000 | 0.44 | 1.0529 | 8.5 | 3,225 | 34,200 |
| CaSO$_4$ | 4.9% | 159,000 | 0.57 | 0.9452 | 11.0 | 2,892 | 29,700 |
| | 18.4% | 168,000 | 0.65 | 1.0363 | 8.6 | 3,063 | 34,500 |
| Franklin | 5.8% | 194,000 | 0.39 | 0.9404 | 12.0 | 3,153 | 25,340 |
| Fiber | 12.7% | 171,000 | 0.54 | 0.9832 | 10.3 | 2,454 | 20,200@ |
| | 18.0% | 174,000 | 0.67 | 1.0151 | 6.7 | 3,185 | 34,620 |
| Celite | 5.9% | 177,000 | 0.58 | 0.9467 | 5.2 | 4,020 | 56,300 |
| | 11.2% | 184,000 | 0.51 | 0.9807 | 4.8 | 3,402 | 39,900 |
| | 15.3% | 194,000 | 0.51 | 1.0136 | 4.1 | 4,169 | 45,850 |
| MICA | 6.1% | 178,000 | 0.63 | 0.9508 | 7.7 | 4,776 | 53,560 |
| | 9.0% | 187,000 | 0.51 | 0.9697 | 13.1 | 2,780 | 48,190 |
| TALC | 5.5% | 195,000 | 0.53 | 0.9468 | 6.9 | 4,399 | 50,050 |
| | 9.3% | 210,000 | 0.52 | 0.9679 | 12.7 | 4,070 | 42,190 |

@ $\eta$ *0.16

TABLE 4

| FILLER | % FILL | DSC/$\Delta$Hf C°/Cal/g | (5% STAIN) $\eta$ *100 | $\eta$ *0.1 | FLEX × 10$^3$ psi | IZOD IMPACT NOTCHED 23° C. ft lb/in | MELT FLOW PELLETS g/10 min | TENSILE YIELD psi | % ELONGATION |
|---|---|---|---|---|---|---|---|---|---|
| Control | 0 | 163.0/23.4 | 6,068 | 73,500 | 154.2 | 1.00 | 3.6 | 4400 | 14 |
| Micro | 3.0 | 163.3/22.7 | 4,137 | 42,950 | 160.2 | 1.10 | 6.1 | 4293 | 13 |
| Talc | 5.7 | 162.0/22.5 | 5,215 | 65,610 | 167.0 | 1.24 | 4.3 | 4376 | 12 |
| | 17.6 | 162.8/18.7 | 3,348 | 42,050 | 194.8 | 0.96 | 7.1 | 4160 | 10 |
| Mica | 2.0 | 162.4/23.1 | 5,822 | 83,380 | 156.8 | 0.88 | 4.1 | 4288 | 14 |
| | 5.2 | 161.6/21/3 | 4,509 | 65,400 | 157.6 | 0.81 | 3.6 | 4131 | 14 |
| | 9.9 | 162.1/23.1 | 3,989 | 29,070 | 186.5 | 0.55 | 8.0 | 4230 | 12 |
| Surface | 3.7 | 162.2/22.9 | 6,133 | 95,950 | 155.8 | 1.10 | 2.7 | 4305 | 15 |
| Treated | 5.2 | 162.3/19.1 | 5,082 | 94,460 | 151.0 | 1.03 | 4.4 | 4207 | 13 |
| Kaolin | 17.0 | 161.2/21.1 | 3,804 | 34,100 | 181.5 | 0.49 | 7.7 | 4070 | 12 |

The above embodiments and examples are given to illustrate the scope and spirit of the present invention. These embodiments and examples will make apparent, to those skilled in the art, other embodiments and examples. These other embodiments and examples are within the contemplation of the present invention; therefore, the instant invention should be limited only by the appended claims.

What is claimed is:

1. A method to reactor-fill polyolefins useful for preparing a reactor-filled polyolefin composite having a relatively uniform distribution of filler particles blended therein comprising the steps of:
    (a) adding a catalytic amount of a transition metal halide to a filler material to initiate the formation of atactic polyolefin on the surface and in the pores of said filler material, said filler material being present in the composite in proportions to act as a filler;
    (b) contacting the product of step (a) in no specific order with a high activity polymerization catalyst, a cocatalyst, and, if necessary a cocatalyst modifier wherein said high activity polymerization catalyst comprises:
        (i) a pretreated inorganic or organic support material;
        (ii) an organomagnesium compound;
        (iii) at least one transition metal containing compound effective in alpha-olefin polymerization reactions; and as appropriate;
        (iv) an alcohol or modifying compound, and
    (c) adding an alpha-olefin under olefin polymerization reaction conditions to the reaction product of step (b) to cause formation of said reactor-filled composite.

2. The method of claim 1 wherein the product of step (a) is contact with a cocatalyst, a cocatalyst modifier and then a high activity polymerization catalyst.

3. The method of claim 2 wherein the filler material is a filler selected from the group consisting of mica, talc, kaolin, CaCO$_3$, Mg(OH)$_2$, clay, diatomaceous earth, CaSO$_4$, fly ash, silica, glass spheres, glass fibers, polyvinyl alcohol, graphite, titanium dioxide, carbon black, aluminum, and copper.

4. The method of claim 3 wherein the filler material is mica, talc or kaolin.

5. The method of claim 2 wherein the transition metal halide is a transition metal halide of the formula MX$_a$Y$_b$ wherein M is a metal from Groups IVB, VB and VIB of the Periodic Table of Elements; X is a halogen; Y is the same or different alkyl, alkoxy, aryl, Aaryloxy, benzyl, heteroatom containing, carbonyl, or alkylsilyl; and a and b is an integer 3 or 4; with the proviso that Y cannot all be alkoxy.

6. The method of claim 5 wherein M is Ti; X is chloride; and a is 4.

7. The method of claim 2 wherein the amount of the low activity catalyst added to the filler is from about 0.01 to about 100 μmole per gram of filler.

8. The method of claim 7 wherein the amount is from about 0.1 to about 10 μmole of low activity catalyst per 1 gram of filler.

9. The method of claim 2 wherein the filler is dried to effectively remove surface hydroxyl groups from the surface of the filler.

10. The method of claim 9 wherein the filler is dried at 150° C. for about 24 hrs.

11. The method of claim 10 wherein the dried filler is deoxygenated by evacuating under full vacuum and refilling with moisture-free $N_2$ prior to the use thereof.

12. The method of claim 2 wherein the transition metal halide is solubilized in a hydrocarbon solvent.

13. The method of claim 12 wherein the hydrocarbon solvent is heptane.

14. The method of claim 1 wherein the support material is silica.

15. The method of claim 1 wherein the organomagnesium compound is selective from the group consisting of alkyls, alkoxides or aryls of magnesium or its complexes.

16. The method of claim 15 wherein the organomagnesium compound has one of the formulas:

$R^2MgX_1$;

$R'_2Mg$;

and $(R_2{}^2Mg)_nAlR_3{}^2$ wherein $R^1$ and $R^2$ are each independently alkyl or alkoxide containing from 1 to 12 carbon atoms, or aryls such as phenyl, naphthyl and cyclopentadienyl; n is 0.5–10; and $X_1$ is a halide.

17. The method of claim 16 wherein the organomagnesium compound is an alkoxymagnesium chloride.

18. The method of claim 1 wherein the transition metal compound(s) has the structural formula(s) $M''(OR')_x(O)_y(X^2)_z$ and/or $M'X^2{}_p(OR')_q$ wherein M'' is a metal of Group VB, $X^2$ is a halogen; R' is aryl, alkyl, aralkyl, cycloalkyl or alkylsilyl; x is 0 or an integer from 1 to 5; y is 0 or an integer from 1 to 3; z=(S-x-2y) or 4 or 3 when x=0; y=0; M' is a metal of Group IVB; and p and q range from 0 to 4 with the proviso that sum of p and q is 3 or 4.

19. The method of claim 18 wherein the transition metal compound has the formula $M'X^2{}_p(OR')_q$ wherein M' is titanium; p is an integer from 2 to 4; q is 0 or an integer from 1 to 2 and R' is chloride.

20. The method of claim 19 wherein p is 4 and q is 0.

21. The method of claim 1 wherein the alcohol is n-butyl alcohol.

22. The method of claim 1 wherein the modifying compound is a silane having the formula $SiH_rX_s{}^2$, where $X^2$ is halogen, r is 0 or an integer from 1 to 3, s is an integer from 1 to 4, with the proviso that the sum of r and s is 4.

23. The method of claim 22 wherein the silane is silicon tetrachloride.

24. The method of claim 2 wherein the cocatalyst is an aluminum-containing cocatalyst.

25. The method of claim 24 wherein the aluminum-containing cocatalyst is selected from the group consisting of trialkyl aluminum, alkyl aluminum halides and mixtures thereof.

26. The method of claim 25 wherein the aluminum-containing cocatalyst is a trialkyl aluminum compound.

27. The method of claim 26 wherein the trialkyl aluminum compound is triethylaluminum.

28. The method of claim 2 wherein the cocatalyst modifier is a hydrocarbyl alkoxysilane compound.

29. The method of claim 28 wherein the hydrocarbyl alkoxysilane is isobutyletrimethoxysilane.

30. The method of claim 2 wherein the alphaolefin contains from 2 to about 12 carbon atoms.

31. The method of claim 30 wherein the alphaolefin is propylene or copolymers thereof.

* * * * *